United States Patent

Seader

[15] 3,654,510

[45] Apr. 4, 1972

[54] DIRECT DRIVE VERTICAL DEFLECTION SYSTEM UTILIZING A STORAGE CAPACITOR AND DISCHARGE TUBE IN PLACE OF AN OUTPUT TRANSFORMER

[72] Inventor: William R. Seader, Owensboro, Ky.

[73] Assignee: General Electric Company

[22] Filed: Nov. 14, 1969

[21] Appl. No.: 876,669

[52] U.S. Cl. ..........315/29, 315/27 TD

[51] Int. Cl. ..........H01j 29/76

[58] Field of Search ..........315/27 TD, 27 RD, 29, 28

[56] References Cited

UNITED STATES PATENTS

| | | | |
|---|---|---|---|
| 3,198,978 | 8/1965 | Taylor | 315/27 TD |
| 3,404,310 | 10/1968 | Williams | 315/27 TD |
| 3,423,630 | 1/1969 | Beck | 316/27 RD |
| 3,504,224 | 3/1970 | Reichgelt et al. | 315/27 TD |
| 3,395,313 | 7/1968 | Rogers | 315/27 RD |
| 3,197,671 | 7/1965 | Carlson | 315/27 TD |
| 2,995,679 | 8/1961 | Skoyles | 315/29 |

*Primary Examiner*—Rodney D. Bennett, Jr.
*Assistant Examiner*—J. M. Potenza
*Attorney*—Francis H. Boos, Jr., Harry B. O'Donnell, III, Frank L. Neuhauser, Oscar B. Waddell, Joseph B. Forman and James E. Espe

[57] ABSTRACT

An efficient, comparatively inexpensive, direct-drive vertical deflection system for a television picture tube has been provided. The system employs a storage capacitor and a discharge tube in place of the usual vertical output transformer. The vertical output power tube controls the current supplied to the vertical deflection coils to sweep the lower half of the television picture tube screen. During the period while the lower half of the picture tube screen is being swept, energy is stored in a capacitor connected in series with the vertical deflection coils. The energy stored in this capacitor then supplies the current used to sweep the upper half of the screen. This current is made available through the discharge tube at a controlled rate and flows in an opposite direction through the deflection coils so as to cause the electron beam to be swept from the top of the screen to the middle. A high efficiency is obtained by reason of the storage capacitor and discharge tube because energy which normally would be dissipated in the output power tube is used to supply current for the upper half of the sweep.

12 Claims, 3 Drawing Figures

Patented April 4, 1972 3,654,510

2 Sheets—Sheet 1

INVENTOR
WILLIAM R. SEADER
BY Francis H. Boos, Jr.
HIS ATTORNEY

INVENTOR
WILLIAM R. SEADER
BY *Francis H. Boos, Jr.*
HIS ATTORNEY hereinafter. Deflection coils 11*a* and 11*b* are connected in series circuit relationship with a conductivity controlled power output means comprised by a pentode tube 12. A storage capacitor 13 is connected in series circuit relationship between the plate of the power output tube 12 and the deflection coils 11*a* and 11*b* with the series circuit thus comprised being connected to a 140 volt B+ source of energizing potential. A conductivity controlled discharge means comprised by a triode tube 14 is connected across the series connected deflection coils 11*a* and 11*b* and storage capacitor 13 for a purpose to be described more fully hereinafter. Sensing and conductivity control means for the triode discharge tube 14 also are provided and comprise a first resistor means 15 connected in series circuit relationship with the deflection coils 11*a*, 11*b*, storage capacitor 13, and the anode of output power pentode tube 12. The sensing and conductivity control means for triode discharge tube 14 also is further comprised by a second resistor means 16 connected in its cathode circuit. A retrace tuning capacitor 17 is connected across the deflection coils 11*a* and 11*b* in parallel circuit relationship and serves to tune the deflection coils to a frequency having a period equal to twice the desired retrace interval.

The circuit of FIG. 1 is completed by a sweep rate pulse generator source comprised by a pulse generator circuit 21 having its output connected to the control grid of the output power pentode tube 12. The pentode tube 12 has its cathode connected directly to its suppressor grid and its screen grid connected through a limiting resistor 22 to a 150 volt B++ source of energizing potential. The cathode of the triode discharge tube 14 is connected through the second resistor 16 to the juncture of storage capacitor 13 with the first sensing resistor 15, and the control grid of triode tube 14 is connected through a limiting resistor 23 to the plate of the output power pentode tube 12 so that in effect the first sensing and conductivity control resistor 15 is connected in the cathode-control grid circuit of triode discharge tube 14. The plate of the triode discharge tube 14 is connected to the 140 volt B+ source of energizing potential.

In operation, the pulse generator circuit 21 supplies positive going, sweep rate signal pulses to the control grid of the output power pentode tube 12 at the normal vertical sweep rate of a commercial television receiving system. With the output power tube 12 in its non-conducting position, the vertical deflection coils 11*a* and 11*b* normally will position the cathode ray beam of the picture tube which they control at the center of the screen. Upon a turn-on pulse being supplied to the output power tube 12, current flow through the vertical deflection coils 11*a* and 11*b* causes the cathode ray beam to be swept from the center to the bottom of the screen. During this interval, the storage capacitor 13 in series with the deflection coils 11*a* and 11*b* will store sufficient energy to later sweep the cathode ray beam from the top of the screen to its center, upon the triode discharge tube being rendered conductive. However, in the intervening period, the energy stored in the magnetic field of the deflection coils at the end of the sweep period is used to rapidly move the CRT beam from the bottom toward the top (vertical retrace) of the CRT screen. Tuning capacitor 17 sets the length of the desired retrace interval by setting the period of the resonant frequency of the network comprised of the deflection coils 11 and tuning capacitor 17 at twice the desired retrace interval.

When the output tube 12 is switched to the cut-off state at the end of the sweep interval (the start of the retrace interval), the energy stored in the magnetic field of the deflection coils 11 moves the CRT beam from the bottom to the center of the screen and at the same time charges capacitor 17. Capacitor 17 then discharges through the deflection coils 11 to move the beam from the center of the screen to the top. FIG. 2 of the drawing illustrates the relatively short time interval of the vertical retrace period. Because of the polarity of the retrace voltage pulse, discharge tube 12 is prevented from conducting during the retrace interval.

To sweep the cathode ray beam from the top to the center of the television picture tube screen, the current through the deflection coils 11a and 11b must flow in the reverse direction from that required to sweep the beam from the center to the bottom of the screen. The required sweep current for this purpose is supplied by the storage capacitor 13, and is reversed through the coils by discharging storage capacitor 13 through the deflection coils 11 at a controlled rate by varying the conductivity of the discharge tube 12. Storage capacitor 13 and discharge tube 14 in a direct-drive system provides a solution to one of the problems enumerated above, namely supplying a bi-directional current through the vertical deflection coils of the picture tube. The first and second resistors 15 and 16 indirectly control the conduction rate of the discharge tube 14 which in turn controls the magnitude and the linearity of the first half of the vertical sweep (top to center) of the cathode ray beam. The combined voltage drop across resistors 15 and 16 determines the grid to cathode voltage applied to the control grid of triode discharge tube 14 at any point in the sweep interval. The second resistor 16 primarily affects the magnitude of the upper half of the sweep but it also has an effect on the linearity of the first few milli-seconds of the upper half of the sweep. The first resistor 15 primarily affects the linearity of the sweep in the center region of the picture tube screen, and the drive wave form of the signal voltage supplied to the control grid of the output power tube 12 determines the magnitude and linearity of the lower half of the sweep.

FIG. 2 of the drawings illustrates the combined wave form of the two sweep current $i_{dch}$ and $i_p$ where $i_p$ is the current flowing during the conducting interval of the output power tube 12, and $i_{dch}$ is the discharge current flowing through triode discharge tube 14 as a result of the discharge of storage capacitor 13 during the upper half of the sweep. From a consideration of FIG. 2, it will be noted that both the discharge tube 14 and the vertical output power tube 12 are conducting for more than one half of the vertical sweep interval, and therefore have overlapping conducting periods. The current flow through the discharge tube 14 normally will become nonlinear in the cut-off region of the tube; therefore, the output power tube 12 purposely is made to conduct at this point in time (as shown in FIG. 2) to improve the linearity of the sweep in the center region of the screen. Resistors 22 and 23 are included in the circuit to prevent parasitic oscillations.

The overriding advantage of the direct-drive vertical deflection system shown in FIG. 1 is made possible by the use of the storage capacitor and discharge tube 14 in place of an output coupling transformer. By reason of this substitution, a highly efficient circuit is obtained. The high efficiency is attributable to the fact that the energy during one half of the sweep is stored in storage capacitor 13 instead of being dissipated in the output tube as it is with normal arrangements, and accordingly the conduction period of the output tube now can be only slightly more than one half of the vertical scan interval. To establish this improvement in efficiency, power measurements were made with a conventional transformer-coupled system, and it was determined that 4.9 watts of input power were required to sweep the cathode ray beam from the top to the bottom of the picture tube screen. In comparison, the direct-drive deflection system made available by the present invention requires only 2.8 watts of input power. The efficiency of the present direct-drive system therefore is approximately 75 percent greater than that of the conventional transformer-coupled system. Further, vertical decentering cannot occur in the circuit made available by the invention because the storage capacitor 13 will block any direct current component from flowing through the deflection coils.

In order to economically construct the circuit and employ a power output tube of practical size and cost in the direct-drive system of the invention, the vertical deflection coils 11*a* and 11*b* were designed in a manner to reduce the peak current requirement to within the capability of a practical size and cost tube. This was achieved by increasing the number of turns of the deflection coil to about 2500 turns, and employing a

DIRECT DRIVE VERTICAL DEFLECTION SYSTEM UTILIZING A STORAGE CAPACITOR AND DISCHARGE TUBE IN PLACE OF AN OUTPUT TRANSFORMER

BACKGROUND OF INVENTION

Field of Invention

This invention relates to a new and improved direct drive deflection system for a cathode ray tube.

More particularly, the invention relates to a direct drive vertical deflection system for a television picture tube.

Statement of Prior Art

In the past, direct drive (transformerless) vertical deflection systems for television picture tubes have not been preferred by the industry because of their comparative inefficiency and poor performance when compared to the present, universally used transformer-coupled systems. The poor efficiency and low performance thus far obtainable from existing direct-drive vertical deflection systems results from the fact that a good power match between the picture tube yoke and the vertical output power tube could not be achieved without considerable expense and complexity which would offset the cost advantage of using a direct-drive system.

Considerable effort has been expended in an effort to reduce the cost of portable television receivers through the elimination of the vertical output transformer from the vertical deflection system. Elimination of the vertical output transformer requires that the deflection coils of the picture tube be directly connected to the plate of the vertical output power tube. To do this, two problems must be overcome by the designer. The first problem is presented by the requirement that a bi-directional current must flow through vertical deflection coils in order to deflect the cathode ray beam from the top to the bottom, and then quickly back again (retrace) to the top of the screen in a most economical manner. If, in a direct-drive system, the deflection coils are directly connected to the plate of the power output tube, current can flow in only one direction from the power source through the coils and through the plate of the power output tube. The second problem encountered by a designer stems from the requirement that the vertical deflection current, which must be applied to the deflection coils of most modern receivers to vertically sweep the cathode ray beam, must be reduced in order that an economically priced and reasonably sized vertical output power tube may be used in a direct-drive system.

The prior art direct-drive systems thus far made available in the industry have suffered from poor efficiency, vertical decentering of the cathode ray beam due to a direct current component flowing through the deflection coils as a result of component aging, etc., and expensive and fragile construction of the deflection coils employed on the yoke of the picture tube.

SUMMARY OF THE INVENTION

It is therefore a primary object of the present invention to provide a new and improved, direct-drive vertical deflection system for a television picture tube which obviates the above listed undesirable features.

Another object of the invention is to provide such a direct-drive vertical deflection system using deflection coils which may be fabricated readily and inexpensively from commercial grade wire having sufficient tensile strength not to require special handling, and yet which provides desirable physical electrical characteristics sufficient to enable use of reasonably sized and inexpensive active elements.

A still further object of the invention is to provide such a direct-drive vertical deflection system having extremely high operating efficiency due to the fact that energy is stored in a storage capacitor instead of being dissipated in the power output tube, and further due to the fact that the conduction period of the power output tube is only slightly more than one half of the vertical scan interval.

In practicing the invention, an efficient and economical direct-drive vertical deflection system for a television picture tube is provided by using a storage capacitor and a discharge tube in place of the normal vertical output transformer. The vertical output power tube controls the ray supplied to the vertical deflection coils to sweep the lower half of the television picture tube screen. During the period that the lower half of the screen is being swept by current supplied from the power source at a rate determined by the conductivity of the vertical output power tube, energy is stored in the storage capacitor which is connected in series with the vertical deflection coils. The energy stored in this capacitor then supplies the current required to sweep the upper half of the screen through the medium of controlled discharge by means of a discharge tube. The high efficiency is attained due to the fact that energy which normally would have been dissipated in the output power tube is used to provide the current required to sweep the upper half of the television picture tube.

It will be appreciated therefore that the direct-drive deflection system provided by by-pass invention comprises a conductively controlled power output tube which is periodically rendered conductive at a predetermined sweep rate. Vertical deflection coils of a television picture tube are connected to the anode of the power output tube and to a source of energizing potential. A storage capacitor is connected in series circuit with the deflection coil intermediate the deflection coil and the output load terminal of the power output tube. A discharge tube is connected in parallel with the series combination of the deflection coils and the storage capacitor. With this arrangement, the discharge tube periodically discharges the storage capacitor through the vertical deflection coils during the intervening non-conductive periods of the power output tube. A sensing and conductivity control resistor is connected in circuit relationship with both the power output tube and the discharge tube for controlling conductivity of the discharge tube. A retrace tuning capacitor is connected in parallel across the deflection coil for tuning the same to a frequency having a period equal to twice the desired retrace interval. In preferred arrangements, the power output tube comprises one of the active elements of a multi-vibrator type, time base generator which further includes a conductivity controlled sweep rate oscillator tube having its control grid coupled back to and controlled by the parallel connected deflecting coils and retrace tuning capacitor.

BRIEF DESCRIPTION OF DRAWINGS

Other objects, features and many of the attendant advantages of this invention by-pass be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENT

Figure 1:
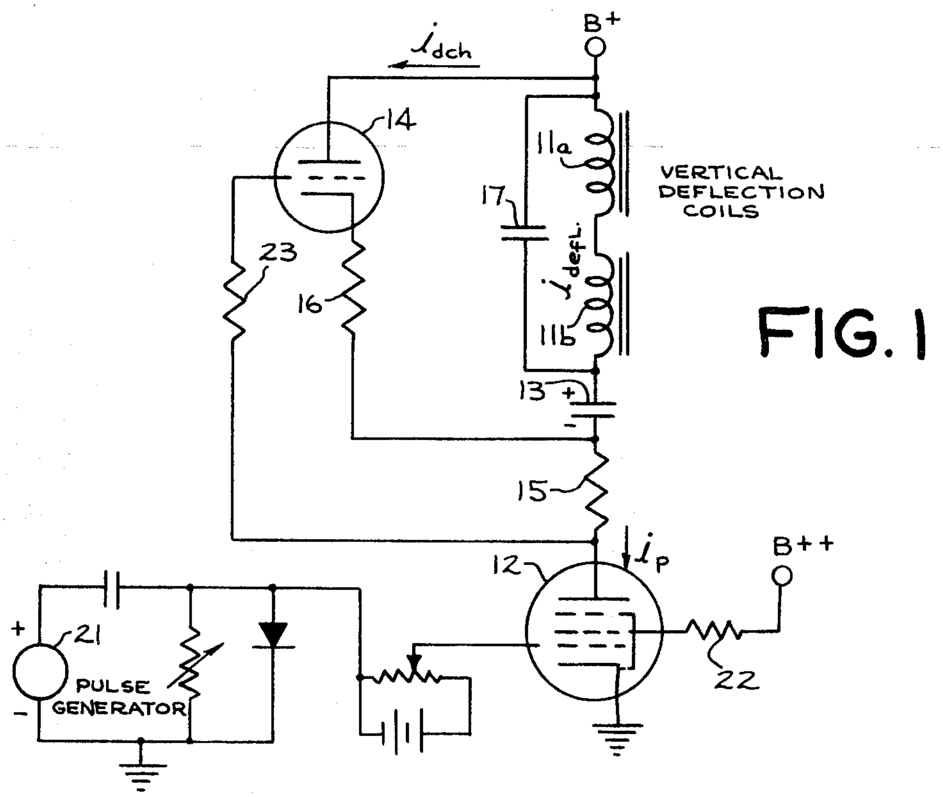
FIG. 1 is a schematic circuit diagram of the essential parts of a direct-drive vertical deflection system constructed in accordance with the invention.
Figure 2:
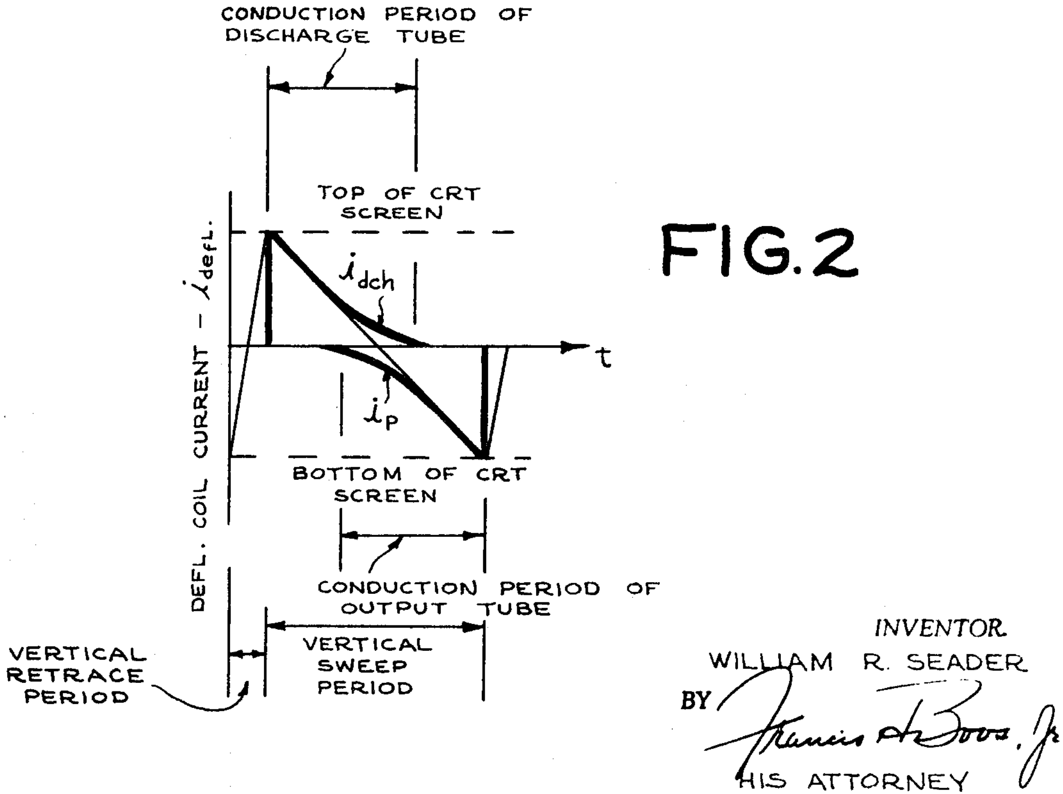
FIG. 2 is a characteristic curve showing the current versus time characteristics of the direct-drive vertical deflection system shown in FIG. 1.

FIG. 1 of the drawings is a schematic circuit diagram of the basic component parts of a direct-drive vertical deflection system for a television picture tube constructed in accordance with the invention. In FIG. 1 a set of vertical deflection coils comprised by two windings **11*a* and 11*b*, connected in a series circuit relationship, is provided for vertically scanning the cathode ray beam of a television picture tube along the vertical axis of the screen. The physical characteristics of the deflection coils 11*a* and 11*b* will be described more fully commercially available No. 34 AWG magnet wire in the fabrication of the coils. The turns of the coils can be wound on a conventional yoke using a torroidal or saddle type coil configuration as determined by the requirements of the picture tube with which the vertical deflection system is used. The vertical deflection coils thus fabricated when excited with an excitation signal frequency of 1000 cycles per second exhibited an inductance of 1040 millihenries and a DC resistance of about 346 ohms. Fabrication of the vertical deflection coils 11***a* and 11*b* in the above described manner provides a practical solution of the second problem mentioned above since it allows a practical sized output power tube to be employed in driving the system.

Figure 3:
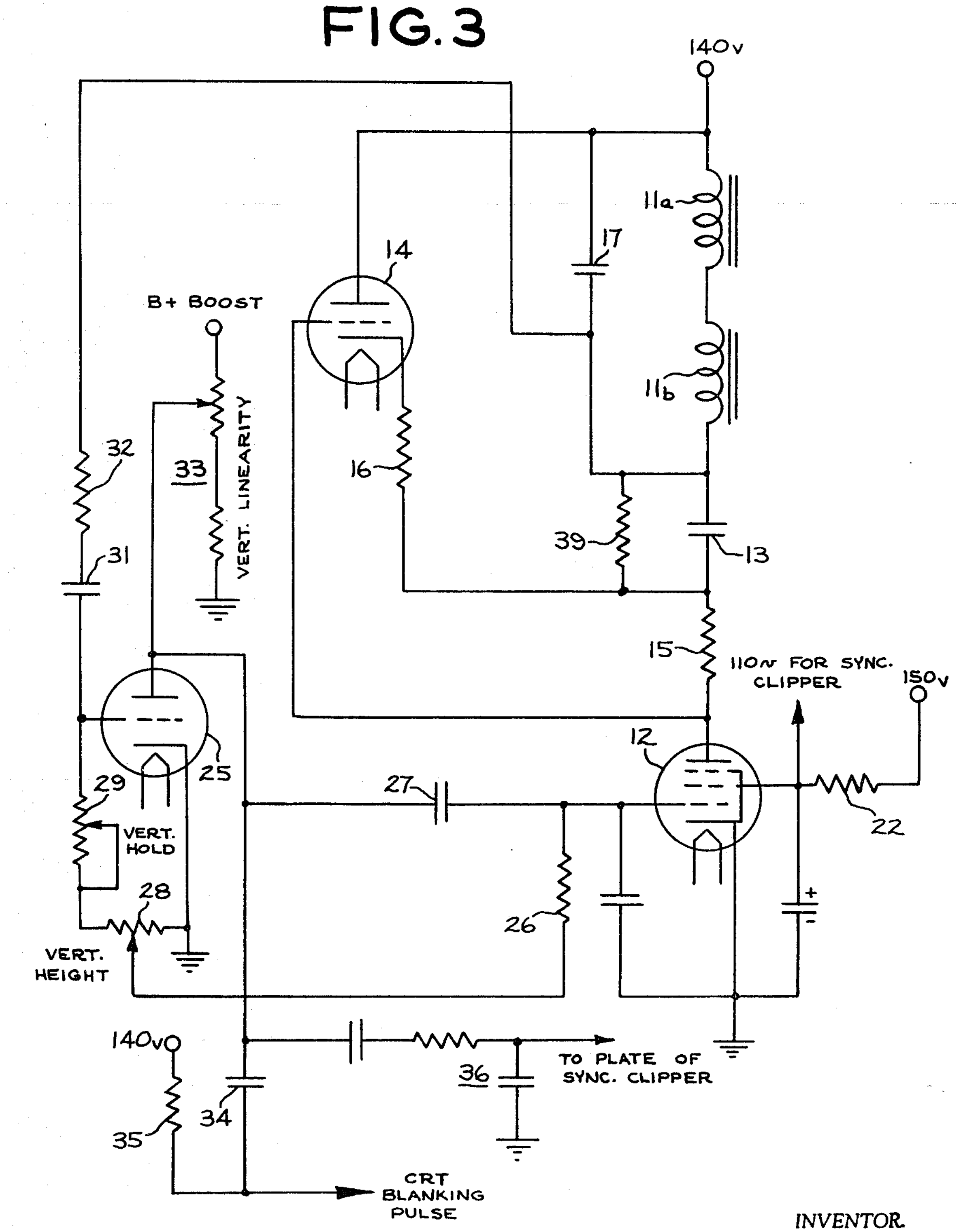
FIG. 3 is a detailed schematic circuit diagram of a preferred form of the direct-drive vertical deflection system of the invention.

FIG. 3 is a detailed schematic circuit diagram of a preferred form of a direct-drive vertical deflection system constructed in accordance with the invention. In the embodiment of the circuit shown in FIG. 3, the output power tube 12 is included in and comprises one of the active elements of a multivibrator-type time base generator which is further comprised by an oscillator tube 25. The oscillator tube 25 is a triode electron discharge tube having its anode connected through a resistance-capacitance coupling network comprised by a resistor 26 and capacitor 27 to the control grid of the output power pentode tube 12. The resistor 26 is connected directly back to the variable tap point of a vertical height adjusting resistor 28 that is connected in series circuit relationship with a vertical hold adjusting resistor 29 across the control grid and grounded cathode of triode oscillator tube 25. The control grid of triode 25 also is coupled back through a feedback capacitor 31 and limiting resistor 32 to a tap point on the parallel connected deflection coils 11*a*, 11*b* and retrace tuning capacitor 17. Resistor network 33 connected to the anode of triode 25 provides a vertical linearity adjustment.

Capacitor 34 and resistor 35 comprise a network which differentiates the signal voltage on the plate of triode 25 to form the negative blanking pulses which are coupled though capacitor 34 to the screen grid of the picture tube. Synchronizing pulses from the plate of a synchronizing pulse clipper tube are processed by network 36 and coupled to the anode of triode 25 to synchronize the vertical sweep circuit with the incoming video information to the receiver.

Oscillator tube 25 conducts only during the vertical retrace interval. The voltage pulse developed across the deflection coils during retrace is coupled through capacitor 31 to the control grid of the vertical oscillator tube 25. This positive going pulse switches the oscillator to the conduction state at the beginning of vertical retrace. The charge stored on capacitor 35 is used to negatively bias the control grid of tube 25 to switch it to the non-conduction state at the end of the retrace period. Sufficient charge remains on capacitor 35 throughout the vertical sweep interval to maintain this non-conduction state. Turn off of the oscillator tube 25 results in turning on output power tube 12 which thereafter conducts to cause the cathode ray beam to be swept down the lower half of the screen in the previously described manner. This cycle of oscillations is repeated periodically at the vertical sweep rate. The arrangement is the same as that used to generate the drive for the vertical output power tube in many modern television receivers wherein the vertical output tube 12 serves in a dual capacity as one of the active elements in the multivibrator-type time-base generator (with the oscillator tube 25 comprising the other active element), and output power tube 12 also serves as the active element in the output power amplifier which furnishes the drive to sweep the cathode ray beam vertically over the lower half of the picture tube screen at the vertical sweep rate of 60 cycles per second.

In the preceeding description, for the sake of simplicity, the terms "linear deflection coil current" and "linear sweep" (linear scanning of the cathode ray beam), have been used interchangeably. However, the two terms are not synonymous. As the cathode ray beam is swept to the outer periphery of the face or screen of the picture tube, a smaller change in deflection current will give the same amount of beam deflection as was obtained when the beam was near the center of the screen. Therefore a linear screen sweep is obtained when the deflection current characteristic is S-shaped and not linear. In other words the slope of the deflection coil current must be increasing as the beam is swept from the periphery to the center of the screen. In the present direct-drive vertical deflection system, the desired S-shape for the upper half of the deflection coil sweep current, is formed by properly proportioning the values of storage capacitor 13 and second resistor 16 to give the correct slope to the deflection coil current at the beginning of the sweep. At the end of the upper half of the sweep, by gradually increasing the conduction rate of the power output tube 12, the slope of the deflection coil current will gradually increase as the beam sweeps from the top to the center of the face of the picture tube. If the power output tube is conducting at the same time that the discharge tube is conducting, the voltage developed across the first sensing and control resistor 15 decreases the conduction rate of the discharge tube 14 to provide the desired S-shape characteristic. The S-shape characteristic is obtained for the lower half of the sweep current by driving the output power tube 12 near the knee of its plate characteristic curve. The size of the first sensing and control resistor 15 determines how close to the knee of its output characteristic curve, the output power tube 12 is driven. The resistors 15 and 16 also serve the additional purpose of harmonizing the discharge characteristics of different triode discharge tubes from one circuit to another. With these considerations in mind, the value of the first sensing and control resistor 15 is made as large as practical so as to reduce the current flow through the discharge tube 14 to a minimum value during the time that the lower half of the sweep current is being generated by the power output tube 12. By connecting the screen grid of the power output 12 through a limiting resistor 22 to a 150 volt positive source of potential, the plate voltage of the power output tube 12 is prevented from falling below the knee of its characteristic curve by any appreciable amount. This prevents the plate current of power output tube 12 from being reduced below the value that assures the power output tube can be turned on and off properly by the triggering signal voltage supplied to its control grid from the oscillator tube 25. Thus, proper operation of the circuit is assured.

In operation, the circuit of FIG. 3 performs very well and provides a good linear vertical sweep for the cathode ray picture tube with which it is used. The two fields of the deflection coils are well interlaced. The sweep circuit requires only 3.7 watts of input power in comparison to a conventional transformer-coupled circuit which requires on the order of 4.9 watts of input power. The circuit holds synchronization well and requires no more effort to adjust for proper height and linearity than does its transformer-coupled counterpart. The circuit also performs well with input supply line voltage variations ranging from 105 to 130 volts rms.

From the foregoing description, it will be appreciated that the present invention makes available a new and improved direct-drive vertical deflection system for a television picture tube which may be fabricated readily and inexpensively from commercial components without requiring special handling of parts and provides desirable desirable physical and electrical characteristics. The direct-drive vertical deflection system has extremely high operating efficiency in that it requires only 3.7 watts of input power whereas transformer-coupled systems of comparable performance requires 4.9. In addition to these characteristics, the direct-drive deflection system is affected less by high ambient temperatures and allows a considerable reduction in the weight and size of the deflection system in comparison to its transformer-coupled counterpart. Additionally, while electron tube form of hardware has been employed in fabricating the present direct-drive vertical deflection system, it is believed obvious that other comparable forms of electronic active elements such as transistors can be employed in the construction of the circuit.

Having described several embodiments of a new and improved direct-drive vertical deflection system constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is to be claimed is:

1. A direct drive deflection system for a cathode ray tube comprising conductivity controlled power output means having an output load terminal and periodically rendered conductive at a predetermined sweep rate, deflection coil means for a cathode ray tube connected in series circuit relationship with the output load terminal of said power output means and a source of energizing potential, storage capacitor means connected in series circuit relationship with said deflection coil means and the output load terminal of said power output means, conductivity controlled discharge means connected across the said deflection coil means and said series connected storage capacitor means for periodically discharging the storage capacitor means through said vertical deflection coil means during intervening non-conducting periods of said power output means, sensing and conductivity control means connected in circuit relationship with said power output means and said discharge means for controlling the conductivity of said discharge means, and retrace tuning capacitor means connected in parallel circuit relationship with said deflection coil means for tuning the same to a frequency having a period equal to twice the desired retrace interval.

2. A direct drive deflection system according to claim 1 wherein said sensing and conductivity control means comprises first resistor means connected in circuit relationship with the load terminal of said power output means and said storage capacitor means and connected to control the conductivity of said discharge means.

3. A direct drive deflection system according to claim 2 wherein said discharge means comprises a gate controlled electron flow discharge device and said sensing and conductivity control means further comprises second resistor means effectively connected in the gate control circuit of said discharge means for controlling the conductivity thereof in conjunction with said first resistor means.

4. A direct drive deflection system according to claim 3 wherein said first and second resistor means are proportioned to provide overlapping periods of controlled conduction for said power output means and said discharge means whereby the linearity of sweep of a cathode raty tube in which the deflection coil means is mounted is closely controlled.

5. A direct drive deflection system according to claim 4 further including by-pass resistor means connected in parallel circuit relationship across only said storage capacitor means for improved sweep linearity.

6. A direct drive deflection system according to claim 4 wherein the conductivity controlled power output means comprises a pentode electron tube having its control grid coupled to a source of periodic sweep triggering signals, its screen grid connected through a limiting resistor to a source of positive potential, its suppressor grid connected directly to its cathode, and its anode comprising the output load terminal coupled through the first resistor means and storage capacitor means to the deflection coil means and source of energizing potential, in the order named.

7. A direct drive deflection system according to claim 6 wherein the gate controlled electron flow discharge device comprises a triode electron tube having the first resistor means connected in the cathode -control grid circuit thereof and in series circuit relationship with the anode of the power output pentode electron tube and the deflection coil means circuit, the anode-cathode of the triode discharge tube being connected across the series connected deflection coil means and storage capacitor means, and the second resistor means connected in the cathode circuit of the triode electron discharge tube.

8. A direct drive deflection system according to claim 7 further including by-pass resistor means connected in parallel circuit relationship across only said storage capacitor means for improved sweep linearity.

9. A direct drive deflection system according to claim 8 wherein the values of the storage capacitor means and the first and second resistor means are so proportioned as to provide an essentially S-shape configuration to the deflecting coil sweep current characteristic curve whereby,for a given amount of cathode ray beam deflection,less current is provided at the outer periphery of the sweep and a linear trace of the electron beam is obtained.

10. A direct drive deflection system according to claim 9 wherein said conductivity controlled power output means comprises one of the active elements of a multivibrator-type time base generator means further including conductivity controlled sweep rate oscillator means coupled back to and controlled by the parallel connected deflection coil means and retrace tuning capacitor means for rendering said sweep rate oscillator means periodically conductive at a predetermined sweep rate, the output from the sweep rate oscillator means being supplied to the conductivity controlled power output means for controlling its conductivity.

11. A direct drive deflection system according to claim 10 wherein the sweep rate oscillator means comprises a triode electron discharge tube having its control grid coupled back through a coupling capacitor and limiting resistor to the parallel connected deflecting coil means and tuning capacitor means and having its anode coupled through a R–C coupling network to the control grid of the power output pentode tube.

12. A direct drive deflection system according to claim 1 wherein said conductivity controlled power output means comprises one of the active elements of a multivibrator-type time base generator means further including conductivity controlled sweep rate oscillator means coupled back to and controlled by the parallel connected deflection coil means and retrace tuning capacitor means for rendering said sweep rate oscillator means periodically conductive at a predetermined sweep rate, the output from the sweep rate oscillator means being supplied to the conductivity controlled power output means for controlling its conductivity.

* * * * *